United States Patent [19]

O'Dell et al.

[11] Patent Number: 5,545,476
[45] Date of Patent: *Aug. 13, 1996

[54] WEAR RESISTANT GLOSSY LAMINATES

[75] Inventors: Robin D. O'Dell; Joseph A. Lex, both of Pasadena; Alice M. Simon; Jayesh Shah, both of Glen Burnie, all of Md.

[73] Assignee: International Paper Company, Odenton, Md.

[ * ] Notice: The term of this patent shall not extend beyond the expiration date of Pat. No. 5,344,704.

[21] Appl. No.: 236,044

[22] Filed: May 2, 1994

Related U.S. Application Data

[63] Continuation-in-part of Ser. No. 43,906, Apr. 7, 1993, Pat. No. 5,344,704.

[51] Int. Cl.$^6$ .............................. B32B 5/16; B32B 27/10; B32B 27/20
[52] U.S. Cl. .................. 428/327; 428/141; 428/142; 428/143; 428/147; 428/148; 428/150; 428/151; 428/172; 428/323; 428/329; 428/331; 428/478.2; 428/524; 428/525; 428/530; 428/908.8
[58] Field of Search .................. 428/147, 323, 428/141, 142, 148, 150, 151, 172, 27, 329, 143, 327, 331, 478.2, 524, 525, 530, 908.8; 427/180, 267, 280, 288; 156/307.4

[56] References Cited

U.S. PATENT DOCUMENTS

| | | | |
|---|---|---|---|
| 2,761,176 | 9/1956 | Welch | 18/47.5 |
| 2,936,814 | 5/1960 | Yakubik | 154/26 |
| 3,082,179 | 3/1963 | Miller | 260/17 |
| 3,135,643 | 6/1964 | Michl | 161/79 |
| 3,345,239 | 10/1967 | Rochow | 161/1 |
| 3,373,070 | 3/1968 | Fuerst | 161/79 |
| 3,373,071 | 3/1968 | Fuerst | 161/79 |
| 3,608,010 | 9/1971 | Stayner | 264/51 |
| 3,968,291 | 7/1976 | Chevallier | 428/203 |
| 4,044,185 | 8/1977 | McCaskey, Jr. et al. | 428/153 |
| 4,109,043 | 8/1978 | Delapp | 428/206 |
| 4,112,169 | 9/1978 | Huffman et al. | 428/206 |
| 4,115,509 | 9/1978 | Kendall-Smith | 264/331 |
| 4,118,365 | 10/1978 | James | 260/39 R |
| 4,255,480 | 3/1981 | Scher et al. | 428/208 |
| 4,311,757 | 1/1982 | Raghava et al. | 428/323 |
| 4,322,468 | 3/1982 | Raghava | 428/204 |
| 4,327,141 | 4/1982 | Scher | 428/148 |
| 4,374,886 | 2/1983 | Raghava | 428/172 |
| 4,395,452 | 7/1983 | Scher et al. | 428/148 |
| 4,400,423 | 8/1983 | Scher et al. | 428/204 |
| 4,430,375 | 2/1984 | Scher et al. | 428/148 |
| 4,433,070 | 2/1984 | Ross | 523/171 |
| 4,473,613 | 9/1984 | Jaisle et al. | 428/220 |
| 4,499,137 | 2/1985 | Odell | 428/211 |
| 4,517,235 | 5/1985 | Ungar | 428/148 |
| 4,532,170 | 7/1985 | O'Dell et al. | 428/143 |
| 4,544,584 | 10/1985 | Ross | 428/15 |
| 4,567,087 | 1/1986 | O'Dell et al. | 428/211 |
| 4,713,138 | 12/1987 | Ungar et al. | 156/307.4 |
| 4,713,299 | 12/1987 | Taylor et al. | 428/526 |
| 5,037,694 | 8/1991 | Ungar | 428/326 |
| 5,093,185 | 3/1992 | Ungar et al. | 428/204 |
| 5,354,595 | 10/1994 | Yamamoto et al. | 428/147 |

FOREIGN PATENT DOCUMENTS

| | | | |
|---|---|---|---|
| 600787 | 6/1960 | Canada . | |
| 836552 | 3/1970 | Canada | 154/134 |
| 1013662 | 12/1965 | United Kingdom . | |

*Primary Examiner*—Dhirajlal Nakarani
*Attorney, Agent, or Firm*—Browdy and Neimark

[57] ABSTRACT

A highly glossy thick aesthetic laminate surface layer is achieved by using pre-cured particulates of the impregnating resin preferably along with an initial binder material and abrasion resistant mineral particles. The protective overcoating may be applied in a thick layer to give gouge resistance and a deep look in the glossy laminate. The overcoated decor sheet is pressed against a mirror plate in the laminate manufacturing process, and gives a gloss meter reading well over 100. Because the impregnating resin and the pre-cured particulates have the same index of refraction, the transparency of the coating and the resultant clarity of the underlying decor sheet are excellent.

47 Claims, 1 Drawing Sheet

WEAR RESISTANT GLOSSY LAMINATES

This is a CIP of co-pending parent application Ser. No. 08/043,906 filed April 7, 1993, the contents of which are hereby incorporated by reference.

FIELD OF THE INVENTION

The present invention relates to laminates and, more particularly to glossy decorative laminates having good scuff and surface wear resistance, suitable for table and counter tops, wall panels and the like, especially high pressure decorative laminates having a mirror or glossy surface.

BACKGROUND

Decorative laminates have been conventionally made by stacking a plurality of layers of paper impregnated with synthetic thermosetting resins. Normally, the assembly consists of a plurality (for example, three to eight) core sheets made from phenolic resin impregnated Kraft paper, above which lies a decor sheet, usually a print or solid color, impregnated with melamine resin. An overlay sheet is often provided on top of the decor sheet which, in the laminate, is made to be as transparent as possible and which provides protection for the decor sheet.

Early attempts to eliminate or simplify or improve the overlay sheet are exemplified in the Fuerst U.S. Pat. No. 3,373,071 and the Michl U.S. Pat. No. 3,135,643. The technique of these patents was to impregnate the decor sheet with plain melamine resin and then apply a thick coating to the surface of the impregnated sheet using a relatively viscous mixture of 2,000–60,000 cp. As a result, the viscous coating dried on the surface of the saturated decor sheet thus in essence forming an overlay sheet in situ. Insofar as is known, laminate made in this fashion never achieved substantial commercial utilization, except possibly for flooring material, possibly because the expense involved, including double handling, i.e. first saturating the impregnated sheet and then coating it, did not justify any modicum of improvement over the use of conventional overlay, or more probably because the resultant laminate was not of sufficient quality for commercial purposes, e.g. cracks, creasing, undue stiffness, insufficient overlay transparency, etc.

A later attempt to provide a more transparent yet fully protective layer over the decor sheet is discussed in the Chevallier U.S. Pat. No. 3,968,291 where barium sulfate is utilized as a particulate filler material in the cast in situ overlay sheet, the patentee having determined that barium sulfate has an index of refraction which is closer to the melamine resin than other fillers, thereby increasing the transparency of the overlayer and consequently the clarity of the decor sheet therebelow. This product also has never achieved any commercial acceptance, possibly for the same reasons as indicated above relative to the Fuerst and Michl patents.

More recently, the present art has been revolutionized by the development of the NEVAMAR ARP® technology, reference being made to Scher et al U.S. Pat. Nos. 4,255,480; 4,395,452; 4,430,375; Re 32,152; 4,263,081; 4,327,141; 4,400,423; Ungar et al U.S. Pat. Nos. 4,713,138; 4,517,235; 4,520,062; 5,037,694; 5,093,185; Lex et al U.S. Pat. No. 4,971,855; and O'Dell et al U.S. Pat. No. 4,499,137; 4,532,170; and 4,567,087. In the ARP® technology the overlayer which protects the decor sheet from abrasion is greatly reduced in thickness so as to provide a highly concentrated layer of abrasion resistant particles bound to the upper surface of the upper paper layer, usually the decor sheet. This technology not only provides improved abrasion resistance over earlier technologies, but provides increased transparency because of the ultra-thinness of the protective layer.

The ARP® technology has served the industry and the public very well, laminate product made according to this technology being recognized as a superior product and being in great demand. Among the Patents mentioned immediately above, the Lex et al U.S. Pat. No. '855 discloses a wear-resistant glossy laminate using the ARP® technology, but using abrasion-resistant mineral particles or grit having a particle size which is quite small so that substantially reduced, i.e. only little, scratching of the polished caul plates occurs during the pressing operation. While the glossy laminates of Lex et al U.S. Pat. No. '855 have excellent abrasion resistance considering the small particle size of the grit used, it would be desirable to be able to produce a glossy laminate, made using highly polished or mirror caul plates, having improved abrasion resistant properties and without causing any scratching and ultimate destruction of such highly polished caul plates. Up to the present invention, this has not been possible.

SUMMARY OF THE INVENTION

It is accordingly an object of the present invention to overcome deficiencies in the prior art, such as those indicated above.

It is another object of the present invention to provide a wear and abrasion resistant glossy laminate having improved characteristics, particularly a high pressure decorative laminate meeting all NEMA requirements, which optionally has a thick protective coating over the decor sheet, which thick protective coating has improved transparency as compared with any previously known thick protective coatings, and which thick protective coating provides both abrasion resistance and clarity and transparency similar to those provided by the ultra-thin protective ARP® glossy laminates according to Lex et al U.S. Pat. No. '855, while utilizing grit of a larger size than that permitted according to U.S. Pat. No. '855 so as to provide better abrasion resistance, and without damaging the polished caul plates.

It is a further object of the present invention to provide an improved glossy laminate product having all of the advantages of both glossy conventional overlay laminate and of glossy ARP® laminate according to U.S. Pat. No. '855.

It is still another object of the present invention to provide an improved glossy decorative laminate product having all the advantages of the wear-resistant glossy laminate of U.S. Pat. No. '855, yet having improved abrasion resistance and even better gloss.

It is still a further object of the present invention to provide an improved glossy decorative laminate product having all of the advantages of ARP® laminate with the further advantages of reduced tool wear and the capability of providing deep look high gloss wood grains meeting NEMA requirements, improved gouge resistance and protection of the highly polished mirror pressing caul plate dies from excessive wear.

It is yet a further object of the present invention to provide a decorative laminate meeting NEMA abrasion resistance standards and having a super high gloss finish having a gloss meter reading 15–20 points higher than what is typically produced in the non-ARP® prior art using the same mirror finish pressing plates.

These and other objects of the present invention are achieved by the utilization of a thick resin-rich protective layer, i.e. one on the order of up to 10x the thickness of the ARP® protective layers, i.e. up to approximately the same thickness as conventional overlay and the cast-in-situ overlays of the early Fuerst and Michl patents typically corresponding to a weight of 25–30 lbs. per ream or more of solids, incorporating a particulate material phase formed of pre-cured thermoset resin particles of a resin having the same or substantially the same index or refraction as the laminating resin itself, plus abrasion resistant mineral particles, the mineral particles and the pre-cured resin particles being held in a matrix of the laminating resin.

In contrast to Michl 3,135,643 and Chevallier U.S. Pat. No. 3,968,291, both of which tried to find and utilize filler materials for their protective layer which would match as closely as possible the refractive index of the laminating resin, the present invention utilizes the principle that the material having the closest index of refraction to the cured laminating resin is the cured laminating resin itself. Therefore, if the laminating resin for the decor sheet is melamine-formaldehyde resin (hereinafter "melamine" resin), as is typical, the major particulate material from which the protective overlayer is formed will be pre-cured melamine resin particles.

According to the present invention, it has been surprisingly discovered, in contrast to the aforementioned Lex et al U.S. Pat. No. '855, that large particle size mineral grit, for example 30 µm particle size, can be used with the precured resin particles to make a high gloss abrasion resistant laminate, indeed such a laminate having a gloss as much as 10 points higher than that achieved according to the aforementioned Lex et al U.S. Pat. No. '855, and without causing damage to the highly polished caul plates or pressing plate dies.

The above and other objects and the nature and advantages of the present invention will be more apparent from the following detailed description of various embodiments.

DETAILED DESCRIPTION OF EMBODIMENTS

Figure 1:
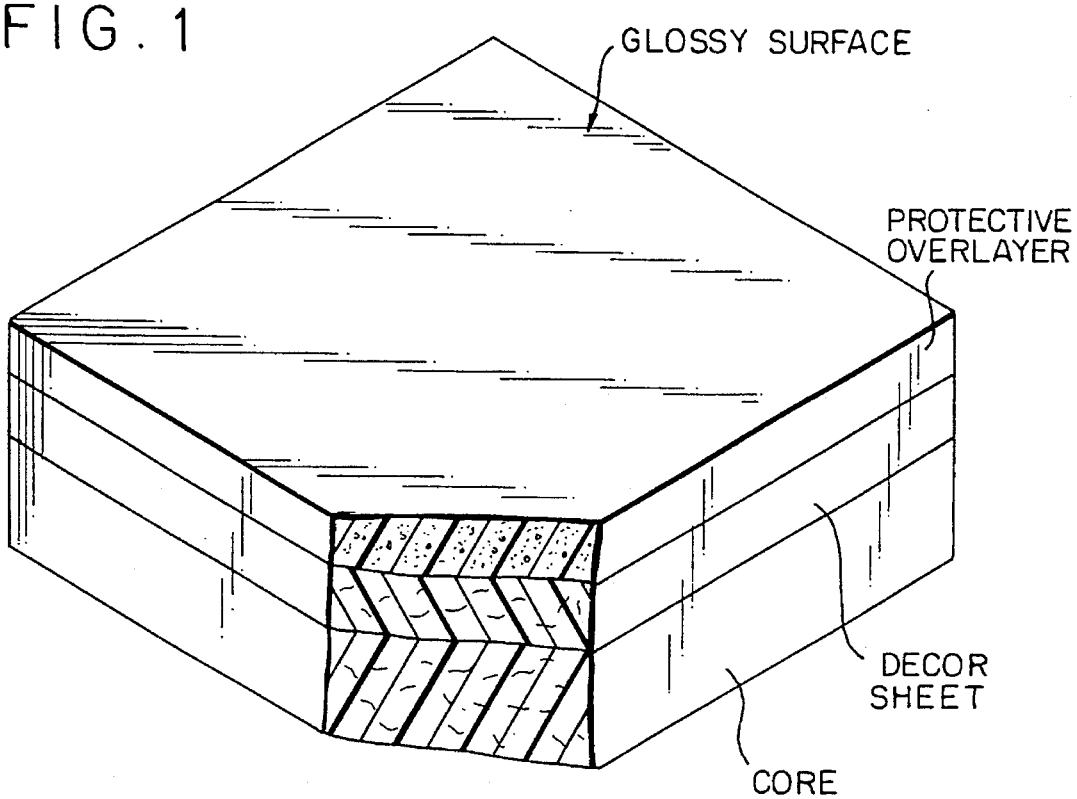
FIG. 1 is a schematic, perspective view partly broken away, of a glossy decorative laminate in accordance with the present invention.

One of the key features of the present invention is the utilization of pre-cured thermoset resin particles formed of a resin which has the same or substantially the same index of refraction as the uncured or partially cured laminating resin used in the laminating process after the latter has become thermoset during the laminating procedure. What is meant by the term "pre-cured" is that the cure or set of the resin particles has been advanced either to the maximum degree possible or at least to a stage of cure where the melt viscosity of the pre-cured resin particles is sufficiently high to prevent these particles from dissolving in the liquid laminating resin and/or melting and flowing under usual laminating conditions and thus undesirably saturating into the underlying paper, e.g. the decor paper, during pressing/laminating to form the laminate. In the resultant laminate, the pre-cured resin particles are normally cured to a greater degree than the laminating resin, the latter forming a matrix for the former.

As indicated above, the typical laminating resin normally used to saturate/impregnate the decor and overlay sheets in the conventional high pressure laminating process to produce high pressure decorative laminates meeting NEMA standards is melamine resin, and consequently melamine resin is the preferred laminating resin for use in the upper layer or layers of the present invention. Consequently, the precured thermoset resin particles are also preferably melamine resin. However, other resin systems are possible, e.g. polyesters, urea-formaldehyde, dicyandiamide-formaldehyde, epoxy, polyurethane, curable acrylics and mixtures thereof. The pre-cured polymer particulates can thus be selected from the group consisting of melamine, polyester, epoxy and curable acrylic, etc. or mixtures thereof.

Under certain conditions and in order to obtain particular effects, it is also possible to use certain non-compatible mixtures of, for example, cured polyester resin particles or polyurethane resin particles together with the cured melamine resin particles and the liquid melamine laminating resin; normally, however, the cured resin is the same as the liquid laminating resin, and any non-compatible cured resin particles are present in only a minor amount, e.g. for decorative purposes.

It is also possible to use mixtures of pre-cured resin particles which are pre-cured to different degrees of set, and indeed it is even possible to use a minor quantity of resin particles which are still capable of partially dissolving in the liquid melamine resin and thus being capable of melting and flowing into the underlying paper, but the quantity of such less cured particles must not be so great that the desired product will not be achieved, i.e. the resultant laminate must have a transparent protective overlayer formed mostly of pre-cured resin, especially in cases where the protective transparent overlay is relatively thick. In cases where the transparent overlayer is very thin, however, up to about 50% or more may comprise the abrasion resistant mineral particles.

Except for the transparent protective layer overlaying the decor sheet, the laminate of the present invention is suitably made according to standard practice and suitably has a conventional construction, e.g. it can comprise 2 to 8 core sheets formed of phenolic impregnated Kraft paper with a melamine resin impregnated decor sheet thereover, plus the protective layer of the present invention over the decor layer pressed by a mirror plate to a high gloss finish. The final laminate is made in the typical way such as by stacking the core layers on a suitable press or pressing plate die with the protective layer-coated decor sheet thereover, and subjecting the assembly to sufficient heat and pressure between the bottom pressing plate die and the highly polished upper pressing plate die for a time sufficient to produce the desired decorative laminate. The conditions of pressing for both high pressure laminate and low-pressure laminate are standard and well known.

The thick transparent protective overlayer coating comprises predominantly the pre-cured thermoset resin particles together preferably with an initial binder material and an abrasion protective amount of relatively fine particle size abrasion resistant mineral, desirably of mean particle size ranging from 0.5–50 µm, preferably about 10–35 µm, and most preferably about 20–30 µm mean particle size. A typical protective overlayer of this type will comprise about 15–20 lbs/ream of pre-cured resin particles and about 6 lbs.

per ream of $AL_2O_3$ particles, and a preferred range is 4–20 lbs/ream of the pre-cured resin particles and 4–8 lbs/ream of the mineral particles. It will be understood, however, that such a transparent protective overlayer can be provided without any mineral particles or with a quantity less than 4 lbs/ream.

The abrasion resistant mineral particles are preferably present in an amount sufficient to partially coat the larger pre-cured resin particle which can be as large as 250 μm but are preferably a maximum of 100 μm. The mineral particles should have a hardness of at least 7 on the Moh scale, and such particles are preferably alumina or a mixture of alumina and silica. Other mineral particles which may be used include zirconium oxide, cerium oxide, hard glass beads, silicon carbide and diamond dust.

Significant quantities of other solid materials, such as fiber flock, etc. should be avoided, as these reduce transparency.

The initial binder material can be any system-compatible material which holds the protective layer coating in place on the upper surface of the decor sheet prior to completion of the laminating process, including a variety of resin-based adhesive materials which are compatible with the laminating resin system selected, a high viscosity or sticky partially cured resin, or any of the materials which are mentioned as useful as binder materials according to the ARP® technology, e.g. sodium alginate, fumed silica, microcrystalline cellulose, or mixtures, e.g. Avicel® which is a blend of mostly microcrystalline cellulose with a small amount of carboxy methyl cellulose (CMC).

Another typical product according to the present invention has a much thinner protective overlayer corresponding to a thickness of 6–8 lbs. per ream of solids, comprising approximately equal quantities of pre-cured resin particles and mineral particles. This is an ARP®-like product having only approximately half the amount of mineral particles as ARP® laminate, but full abrasion and wear resistance with improved tool wear and reduced pressing plate die wear.

The protective coating can be applied to the decor sheet in a variety of ways. These are, very briefly, a two-step process analogous to the ARP® method of Scher et al U.S. Pat. No. 4,255,480; a one-step process analogous to the ARP® method of Ungar et al U.S. Pat. No. 4,713,138; and a transfer process analogous to that of Ungar et al U.S. Pat. Nos. 4,517,235 and 4,520,062.

In a preferred form for use in the two-step method, the coating composition of the present invention is produced from a mixture of the small particles of alumina or other abrasion resistant particles desirably of about 1 to about 30 micron mean particle size, pre-cured resin particulates having a maximum particle size of 250 μm and preferably a maximum particle size of 100 μm, and a lesser amount of Avicel® (microcrystalline cellulose plus CMC) particles, all dispersed in a stable, aqueous slurry. The particles of alumina, of such small size such that they do not interfere with the visual effects in the final product, serve as the abrasion resistant material and the microcrystalline cellulose particles serve as the preferred initial binder material. The Avicel® serves also as a suspending agent for the slurry. It will be understood that the initial binder material must be compatible with the resin system utilized in the laminating procedure, usually melamine resin or in the case of certain low-pressure laminates a polyester resin system, and the microcrystalline cellulose serves this function as well as stabilizing the small particles of alumina and pre-cured resin of the surface of the decor sheet.

Thus, a preferred slurry composition contains a mixture of small particles of alumina and the pre-cured resin particulate and a lesser amount of microcrystalline cellulose particles, all dispersed in water. There must be an amount sufficient of the pre-cured resin particulates and preferably the small mineral particles to provide the resultant product with the desired abrasion resistance as discussed above, and there must be an amount sufficient of the initial binder material to retain the mineral particles and pre-cured resin particulates in place on the surface of the decor facing sheet. In general, it has been found that satisfactory results are attained with about 2 to 10 parts by weight of the microcrystalline cellulose for about 20–120 parts by weight of the alumina and pre-cured resin particulates; however, it is possible to work outside this range. The quantity of pre-cured resin particles should be about 1 to 6 parts by weight per part by weight of mineral particles, it being understood that it is not only possible to work outside this range, but that as indicated above, suitable product having a thick transparent protective overlayer can be made without any mineral particles whatsoever.

The quantity of water in the slurry is also dictated by practical considerations, since if there is too little water the slurry becomes so thick that it is hard to apply; conversely, if there is too much water the slurry becomes so thin that it is difficult to maintain a consistent thickness during the coating operation due to running of the slurry. Thus, a slurry containing about 2 wt% microcrystalline cellulose and about 24 wt% alumina and pre-cured resin particulates, based on the water, is stable, i.e. the alumina and pre-cured resin particles do not settle out; but if more than about 3.5 wt% microcrystalline cellulose and about 24 wt% alumina and pre-cured resin particulates, based on water, are used, the slurry becomes very viscous and difficult to apply.

The mineral-containing particle composition also desirably contains a small amount of wetting agent, preferably a non-ionic wetting agents, and a silane. The quantity of wetting agent is not critical, but only a very small amount is desirable and excess quantities provide no advantage. Humectant, mold release agent, catalyst and/or defoamer may also be present according to conventional practice.

If a silane is used, it acts as a coupling agent which chemically binds the alumina or other inorganic particles to the pre-cured resin particles and/or the later added resin matrix after impregnation and cure, and this provides better initial wear since the alumina particles are chemically bound to the resin in addition to being mechanically bound thereto and therefore stay in place longer under abrasive wear. The silane should be selected from among those which are compatible with the particular thermosetting laminating resin used; in this regard silanes having an amino group, such as gamma-aminoprophyl trimethoxy silane, are particularly effective for use with melamine resins. See the 1976–77 edition of Modern Plastics Encyclopedia, page 160, which lists some silanes useful with melamine and polyester resin systems. The quantity of silane used need not be great and, in fact, as little as 0.5% based on the weight of the particulate mineral is effective to enhance the abrasion resistance of the final laminate; a maximum quantity of about 2% by weight based on the weight of the alumina or other hard particles is suggested since greater quantities do not lead to any significantly better results and merely increase the cost of the raw materials.

After coating with the aforementioned coating composition, the decorative paper is dried and then impregnated in the normal manner with suitable thermosetting resin, e.g. melamine resin or polyester. The coating using microcrystalline cellulose as the binder must be dried at an elevated temperature before the decor sheet is impregnated with the melamine resin. Thus, a minimum drying temperature is about 140° F. and the preferred drying temperatures are from 240°–270° F. After drying, the impregnated and coated decor paper is laid up with a plurality of resin impregnated core sheets or some other backing material, and lamination is carried out in the usual way under heat and pressure.

Another method for achieving the objects of this invention is the one-step process of depositing a layer of pre-cured resin particulates on the surface of a decor sheet simultaneously with the complete resin saturation of the decor sheet in a single step operation, in which the uncured liquid resin is a carrier for the pre-cured resin particles and the abrasion-resistant mineral particles. This process by which the present invention is achieved is best described as follows:

(1) preparing the mixture of the liquid thermosettable impregnating resin and the coating composition, wherein the coating composition includes the mineral particles in an amount sufficient to enhance abrasion resistance without interfering with transparency, the precured synthetic resin particulates in a concentration sufficient to provide the resin deposit of pre-selected thickness on the laminate surface, and an initial binder material for the pre-cured resin particles, e.g. microcrystalline cellulose or even sticky particles of partially cured melamine resin, which initial binder material is compatible with the thermosettable impregnating resin and which will withstand subsequent laminating conditions, the initial binder material being present in an amount sufficient to bind the pre-cured resin particulates to the surface of the unsaturated paper sheet, and the initial binder material also serving to suspend the pre-cured resin particulate material in the liquid thermosettable impregnating resin;

(2) depositing the protective overlayer and impregnating in one operation by coating the mixture of the liquid thermosettable impregnating resin and the coating composition, preferably having a viscosity no greater than about 200–250 centipoise, over a facing surface of the unsaturated paper sheet at a rate such that the unsaturated paper sheet becomes substantially saturated with the liquid thermosettable impregnating resin, and the coating composition becomes deposited on the facing surface; and (3) drying the coated and impregnated paper decor sheet to obtain a decorative sheet ready for lamination.

The hard mineral that may be used in the cured polymer particulate composition is of fine particle size as described above, preferably between about 0.5 and 35 μm mean particle size, although larger sizes may be used as indicated above, in quantities sufficient to provide an abrasion-resistant layer without interfering with visibility. It will be understood that the viscosity of the liquid must be sufficient to maintain the mineral particles in suspension along with the pre-cured resin particles.

The one-operation coating/impregnating step can be carried out in one stage or plural stages, i.e. full impregnation can be effected in the same stage as the coating is laid down, or alternatively partial impregnation can be carried out in a first stage continuous process with the coating, followed by an in-line second impregnation from below.

As noted above, the pre-cured synthetic resin particulates are selected from the group consisting of melamine, polyester, epoxy and curable acrylic or the like resins or mixtures thereof. The binder material is preferably a mixture of microcrystalline cellulose with a minor amount of carboxy methyl cellulose; Avicel® is sold as a mixture of approximately 89% microcrystalline cellulose and 11% carboxy methyl cellulose. It is also possible, although not preferred, for the initial binder material to be the laminating resin itself, in which case the laminating resin must be relatively viscous, in the nature of a syrup or the like.

The preferred composition for the one-step process suitably contains 1 part by weight of Avicel® to 4–60 parts by weight of the combination of the mineral particles and pre-cured resin particulates. As indicated above, while the ratio of pre-cured resin particulates to mineral particles is subject to wide variation, a suitable range is about 1–6:1. It is also possible to add small additional quantities of carboxy methyl cellulose (or none whatsoever) and a small quantity of silane. It is preferable to include a small quantity of surfactant, as disclosed in U.S. Pat. No. 4,255,480, and a small quantity of solid lubricant to provide scuff resistant, as disclosed in U.S. Pat. No. 4,567,087.

There are six important variables in the formulation, three of which are independent and three of which are dependent, all as explained in U.S. Pat. No. 4,713,138. Decor paper weight, liquid resin content and weight of the abrasion resistant composition are all independent of the formulation. The requirements for these variables are set by outside factors such as color, degree of final saturation, and abrasion resistance. Impregnant resin weight (dry) per ream is dependent on a combination of paper basis weight and resin content. Viscosity is dependent on the total volume of liquid versus the content of particulate material. Therefore, the amount of water added to the liquid resin is dependent on the viscosity achieved by mixing the abrasion-resistant composition and uncut resin, and the additional volume required to reduce the viscosity to the desired level for ease of simultaneous coating and impregnation, usually a value of less than about 250 cp, preferably about 100 cp.

A third method, as indicated above, is a transfer method similar to that of Ungar et al U.S. Pat. Nos. 4,517,235 and 4,520,062. In this type of process, the coating of the present invention is applied to a highly polished mirror transfer substrate and dried thereon. The transfer substrate is then applied face down against a fully or partly saturated decor sheet in the normal laminate pressing operation or even against another suitable substrate. After completion of the lamination operation under conditions of sufficient heat, time and pressure, the laminate is peeled away from the transfer substrate, or vice versa, and the protective coating of the present invention will be found to have transferred to the upper surface of the decor sheet or substrate.

The preferred embodiments of the present invention use substantially totally cured melamine resin finely ground to a powder that functions as a physical shim between the press plate and the decorative layer during pressing. By choosing a particle that is the same resin as the impregnating resin, the refractive index of the protective glossy overlayer in the finished laminate will be the same, producing a haze free, highly transparent surface on the laminate after pressing. The transparency so achieved is sufficiently clear so that a solid color decor sheet can be used without loss of brightness or shade.

In addition to a clear thick surface coating many other decorative appearances can be obtained by varying the pre-cured resin particulate used and its particulate size. Interesting visual effects can be obtained by using tinted pre-cured particulates as well. It is contemplated that the variations of appearance are multiple and depend upon particle size, pre-cured resin particulates, quantities, layer thickness and pigmentation. Actual achievement of a desired appearance can be determined based on routine experimentation in view of the present disclosure.

It is very surprising that the high gloss laminate produced according to the present invention has an even higher gloss rating than the glossy laminate produced according to the Lex et al U.S. Pat. No. '855, and using the same mirror finished pressing plates. As shown in the figure of the Lex et al U.S. Pat. No. '855, standard high gloss laminate fall off to a gloss meter value of between 75 and 80 units after about 500 double strokes on the sliding can test, whereas glossy laminate produced according to Lex et al U.S. Pat. No. '855 maintains a gloss meter value between 100 and 105 units even after 2000 double strokes on the sliding can test. Glossy laminate according to the present invention typically has a value of about 105 to 115 units on the gloss meter, and little of this glossiness is lost even after 1500–2000 double strokes on the sliding can test.

The following examples are offered illustratively:

EXAMPLE I

Melamine resin particulates are made by heating melamine resin at 300° F. until cured. Once cured, the material is ground to the approximate particulate size distribution as follows:

| | |
|---|---|
| 250µ + | 0.02% |
| 180µ + | 0.04% |
| 106µ + | 0.47% |
| 45µ + | 70.60% |
| 25µ + | 22.45% |
| under 25µ – | 6.40% |

A slurry of ingredients comprising 60 parts of the above precured melamine particles and 60 parts of 30 µm mean particle size alumina are mixed with 7.5 parts of microcrystalline cellulose (Avicel Rc 581) and 2.5 parts of CMC.

The resultant slurry is applied to an un-impregnated decor paper bearing a wood grain print and the coating is dried at 265° F. for three minutes, followed by saturation with melamine resin and drying in the usual way. Laminae are laid up and the laminate is pressed using a highly polished mirror caul plate and a conventional general purpose cycle of approximately 1000 psi at 290° F. for about twenty-five minutes.

Figure 2:
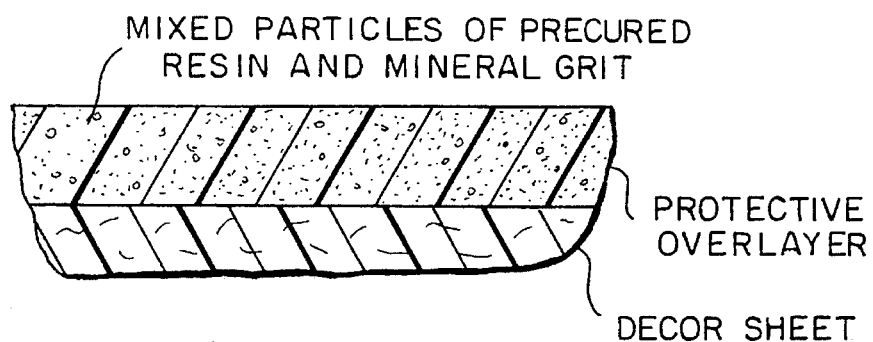
FIG. 2 is an enlarged cross-sectional view, partly broken away, of the protective overlayer and the decor sheet of such a laminate.

The resultant laminate such as shown in FIGS. 1 and 2, is then tested on a gloss meter according to the sliding can tests using 2000 double strokes. Comparatively tested are a standard glossy laminate without overlay and an ARP® glossy laminate according to Lex et al U.S. Pat. No. '855. The results are as follows:

| | Standard Glossy Without Overlay | ARP ® Glossy | Glossy Laminate of Present Invention |
|---|---|---|---|
| Initial Gloss | 106 | 101 | 109 |
| Gloss After 2000 double strokes | 75 | 105 | 107 |

EXAMPLE II

Liquid melamine resin (1575 lbs. solids) is prepared for decor paper impregnated according to standard practice, having a density of 1.15 and 37.7% solids. TRITON CF21 surfactant in an amount of 0.001 part by weight is added per 192.8 lbs. of liquid resin. Mixing is carried out at a high speed in a low shear mixer for five minutes. Eleven pounds of Avicel is rapidly added in a manner so as to avoid clumping or the formation of lumps. Immediately thereafter, 47 lbs. of pre-cured melamine resin particles and 47 lbs. of 30 µm alumina are rapidly added.

The viscosity is measured after adding 70 gal. of water to provide a viscosity of no greater than 150 centipoise (Brookfield viscometer #3, spindle at 12 rpm).

Printed decor paper weighing 65 lbs/ream is coated at the rate of 196.1 lbs/ream. The paper is dried at an elevated temperature, and glossy laminate is prepared using this paper as in the usual way.

EXAMPLE III—ARP, REPLACEMENT

The following formulation is prepared for simultaneously coating and impregnating a solid color decor sheet:

195 gallons of uncut melamine resin (2,047.5 lbs.)

50 gallons water 15 lbs. Avicel 2.9 lbs. wax 33 lbs. 25 µm alumina 66 lbs. precured melamine resin particles (maximum size 100 µm)

0.35 lbs. Emerest 2652 to wetting agent 0.32 lbs. Infirnol mold release agent 8.2 lbs. Nacure 3525 catalyst 1.1 lbs. Bubrake defoamer The above composition is applied at a total deposit rate of about 4.35 lbs. per ream. After drying, the so-coated and impregnated decor sheet is pressed against phenolic impregnated core sheets using a mirror finished plate. The resultant laminate has improved gloss without substantial damage to the mirror finished pressing plate die.

The foregoing description of the specific embodiments reveal the general nature of the invention so that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The patents mentioned above are incorporated by reference.

What is claimed is:

1. In a glossy decorative laminate meeting NEMA abrasion resistant standards comprising a substrate having a decorative upper layer, and a protective overlayer on top of said decorative layer, the improvement wherein:

said protective overlayer is transparent and consists essentially of a cured thermoset resin formed of pre-cured resin particles and optionally mineral particles having a Moh hardness of at least 7 and a mean particle size no greater than 50 µm in a thermoset resin matrix, the resin of the pre-cured particles and the resin of the matrix being the same whereby the index of refraction of said pre-cured resin particles is substantially the same as the index of refraction of said thermoset matrix, said decorative laminate having a gloss meter reading of above 105 to 115 units.

2. A glossy laminate according to claim 1, wherein said overlayer includes said mineral particles in an amount of at least 4 lbs/ream.

3. A glossy laminate according to claim 2, wherein said decorative layer comprises decor paper layer impregnated with a thermoset resin, and wherein said resin of said decor layer and said resin of said protective overlayer are the same resin.

4. A glossy laminate according to claim 3, wherein said laminate is a high-pressure decorative laminate meeting NEMA standards for high pressure laminate, and said resin is selected from the group consisting of melamine resin, urea resin and dicyandiamide resin.

5. A glossy laminate according to claim 2, wherein said mineral particles are selected from the group consisting of alumina, silica and mixtures thereof.

6. A glossy laminate according to claim 2, wherein said transparent protective overlayer further comprises an initial binder material.

7. A glossy laminate according to claim 6, wherein said initial binder material is selected from the group consisting of microcrystalline cellulose, carboxy methyl cellulose, sodium alginate and mixtures thereof.

8. A glossy laminate according to claim 2, wherein said mineral particles have a mean particle size of about 20–35 μm.

9. A glossy laminate according to claim 2, wherein said transparent protective overlayer has a thickness of about 2–3 mils.

10. A glossy laminate according to claim 2, wherein said laminate is a high-pressure decorative laminate meeting NEMA standards for high pressure laminate, wherein said decorative layer comprises a decor paper layer impregnated with melamine resin, and wherein said pre-cured resin particles are melamine resin particles.

11. A glossy laminate according to claim 10, wherein said transparent protective overlayer further comprises microcrystalline cellulose as an initial binder material.

12. In a wear-resistant glossy laminate comprising a backing and a thermoset resin impregnated facing sheet laminated thereto, said facing sheet having an upper facing surface having a wear-resistant overlayer which protects the glossy nature of said surface when exposed to the abrasive effects of sliding objects, said wear-resistant overlayer comprising means for resisting surface dulling consisting of abrasion resistant particles having a hardness of 7–10 on the Moh scale, the improvement wherein:

said abrasion resistant particles have a mean particle size greater than 9 μm said wear resistant layer further comprising pre-cured resin particles mixed with said abrasion resistant particles and held in place by a cured thermoset resin matrix and optionally an initial binder material, the index of refraction of said precured resin particles being substantially the same as the index of refraction of said thermoset resin matrix.

13. A glossy laminate according to claim 12, wherein said initial binder material is selected from the group consisting of microcrystalline cellulose, carboxy methyl cellulose, sodium alginate and mixtures thereof.

14. A glossy binder material according to claim 12, wherein said abrasion resistant particles are of 20–35 μm mean particle size.

15. A glossy laminate according to claim 14, wherein said laminate is a high-pressure decorative laminate meeting NEMA standards for high pressure laminate, wherein said decorative layer comprises a decor paper layer impregnated with melamine resin, and wherein said pre-cured resin particles are melamine resin particles.

16. In a glossy decorative laminate meeting NEMA abrasion resistant standards comprising a substrate having a decorative upper layer, and a protective overlayer on top of said decorative layer, the improvement wherein:

said protective overlayer is transparent and consists essentially of a cured thermoset resin formed of pre-cured resin particles and optionally mineral particles having a Moh hardness of at least 7 and a mean particle size no greater than 50 μm in a thermoset resin matrix, the index of refraction of said pre-cured resin particles being substantially the same as the index of refraction of said thermoset matrix, said decorative laminate having a gloss meter reading of at least 107.

17. A glossy laminate according to claim 16, wherein said overlayer includes said mineral particles in an amount of at least 4 lbs/ream.

18. A glossy laminate according to claim 17, wherein said decorative layer comprises decor paper layer impregnated with a thermoset resin, and wherein said resin of said decor layer and said resin of said protective overlayer are the same resin.

19. A glossy laminate according to claim 18, wherein said laminate is a high-pressure decorative laminate meeting NEMA standards for high pressure laminate, and said resin is selected from the group consisting of melamine resin, urea resin and dicyandiamide resin.

20. A glossy laminate according to claim 15, wherein said mineral particles are selected from the group consisting of alumina, silica and mixtures thereof.

21. A glossy laminate according to claim 17, wherein said transparent protective overlayer further comprises an initial binder material.

22. A glossy laminate according to claim 21, wherein said initial binder material is selected from the group consisting of microcrystalline cellulose, carboxy methyl cellulose, sodium alginate and mixtures thereof.

23. A glossy laminate according to claim 17, wherein said mineral particles have a mean particle size of about 20–35 μm.

24. A glossy laminate according to claim 17, wherein said transparent protective overlayer has a thickness of about 2–3 mils.

25. A glossy laminate according to claim 17, wherein said laminate is a high-pressure decorative laminate meeting NEMA standards for high pressure laminate, wherein said decorative layer comprises a decor paper layer impregnated with melamine resin, and wherein said pre-cured resin particles are melamine resin particles.

26. A glossy laminate according to claim 25, wherein said transparent protective overlayer further comprises microcrystalline cellulose as an initial binder material.

27. In a glossy decorative laminate meeting NEMA abrasion resistant standards comprising a substrate having a decorative upper layer, and a protective overlayer on top of said decorative layer, the improvement wherein:

said protective overlayer has a thickness of about 2–3 mils, is transparent and consists essentially of a cured thermoset resin formed of pre-cured resin particles and optionally mineral particles having a Moh hardness of at least 7 and a mean particle size no greater than 50 μm in a thermoset resin matrix, the index of refraction of said pre-cured resin particles being substantially the same as the index of refraction of said thermoset matrix, said decorative laminate having a gloss meter reading of about 105 to 115 units.

28. A glossy laminate according to claim 27, wherein said overlayer includes said mineral particles in an amount of at least 4 lbs/ream.

29. A glossy laminate according to claim 28, wherein said decorative layer comprises decor paper layer impregnated with a thermoset resin, and wherein said resin of said decor layer and said resin of said protective overlayer are the same resin.

30. A glossy laminate according to claim 29, wherein said laminate is a high-pressure decorative laminate meeting NEMA standards for high pressure laminate, and said resin is selected from the group consisting of melamine resin, urea resin and dicyandiamide resin.

31. A glossy laminate according to claim 28, wherein said mineral particles are selected from the group consisting of alumina, silica and mixtures thereof.

32. A glossy laminate according to claim 28, wherein said transparent protective overlayer further comprises an initial binder material.

33. A glossy laminate according to claim 32, wherein said initial binder material is selected from the group consisting of microcrystalline cellulose, carboxy methyl cellulose, sodium alginate and mixtures thereof.

34. A glossy laminate according to claim 28, wherein said mineral particles have a mean particle size of about 20–35 µm.

35. A glossy laminate according to claim 28, wherein said laminate is a high-pressure decorative laminate meeting NEMA standards for high pressure laminate, wherein said decorative layer comprises a decor paper layer impregnated with melamine resin, and wherein said pre-cured resin particles are melamine resin particles.

36. A glossy laminate according to claim 35, wherein said transparent protective overlayer further comprises microcrystalline cellulose as an initial binder material.

37. In a glossy decorative laminate meeting NEMA abrasion resistant standards comprising a substrate having a decorative upper layer, and a protective overlayer on top of said decorative layer, the improvement wherein:

said protective overlayer is transparent and consists essentially of a cured thermoset resin formed of pre-cured resin particles and mineral particles having a Moh hardness of at least 7 in a thermoset resin matrix, at least some of said mineral particles having a particle size greater than 9 µm, the index of refraction of said pre-cured resin particles being substantially the same as the index of refraction of said thermoset matrix, said decorative laminate having a gloss meter reading of about 105 to 115 units.

38. A glossy laminate according to claim 37, wherein said mineral particles are present in an amount of at least 4 lbs/ream.

39. A glossy laminate according to claim 38, wherein said decorative layer comprises decor paper layer impregnated with a thermoset resin, and wherein said resin of said decor layer and said resin of said protective overlayer are the same resin.

40. A glossy laminate according to claim 39, wherein said laminate is a high-pressure decorative laminate meeting NEMA standards for high pressure laminate, and said resin is selected from the group consisting of melamine resin, urea resin and dicyandiamide resin.

41. A glossy laminate according to claim 38, wherein said mineral particles have a mean particle size no greater than 50 µm.

42. A glossy laminate according to claim 41, wherein said mineral particles are selected from the group consisting of alumina, silica and mixtures thereof.

43. A glossy laminate according to claim 38, wherein said transparent protective overlayer further comprises an initial binder material.

44. A glossy laminate according to claim 43, wherein said initial binder material is selected from the group consisting of microcrystalline cellulose, carboxy methyl cellulose, sodium alginate and mixtures thereof.

45. A glossy laminate according to claim 38, wherein said transparent protective overlayer has a thickness of about 2–3 mils.

46. A glossy laminate according to claim 37, wherein said decorative layer comprises a decor paper layer impregnated with a thermoset resin, said resin of said decor layer and said resin of said protective overlayer being the same resin, and wherein said mineral particles have a mean particle size no greater than 50 µm.

47. A glossy laminate according to claim 46, wherein said same resin is melamine resin, and wherein said transparent protective overlayer further comprises microcrystalline cellulose as an initial binder material.

\* \* \* \* \*